US000001305H

United States Statutory Invention Registration [19]

[11] Reg. Number: H1305

Townsend et al.

[43] Published: May 3, 1994

[54] REFORMULATED GASOLINES AND METHODS OF PRODUCING REFORMULATED GASOLINES

[76] Inventors: Daniel J. Townsend, 5 Butternut, Irvine, Calif. 92715; Jack S. Segal, 8841 Seaspray Dr., Huntington Beach, Calif. 92646; Larry A. Rapp, 22655 Hidden Hills Rd., Yorba Linda, Calif. 92687

[21] Appl. No.: 910,936

[22] Filed: Jul. 9, 1992

[51] Int. Cl.[5] ..... C10L 5/00

[52] U.S. Cl. ..... 44/449; 44/448

[58] Field of Search ..... 208/78, 79, 80, 93, 208/133; 44/448, 449

[56] References Cited

U.S. PATENT DOCUMENTS

| | | | |
|---|---|---|---|
| 1,409,404 | 3/1922 | Ramage | 196/150 |
| 2,032,330 | 2/1936 | Roberts et al. | 196/11 |
| 2,190,480 | 2/1940 | Nichols, Jr. et al. | 196/11 |
| 2,204,215 | 6/1940 | Greensfelder et al. | 44/9 |
| 2,409,157 | 10/1946 | Schulze et al. | 44/80 |
| 2,593,561 | 4/1952 | Herbst et al. | 44/69 |
| 2,857,254 | 10/1958 | Thomas | 44/63 |
| 2,968,609 | 1/1961 | Lutz | 208/100 |
| 3,002,917 | 10/1961 | Hamilton | 208/79 |
| 3,009,789 | 11/1961 | Jordan et al. | 44/52 |
| 3,385,680 | 5/1968 | Feld et al. | 44/2 |
| 3,391,077 | 7/1968 | Osborne | 208/256 |
| 3,753,670 | 8/1973 | Strang | 44/72 |
| 3,758,401 | 9/1973 | Bridgeford et al. | 208/78 |
| 3,765,848 | 10/1973 | Brent | 44/51 |
| 3,785,790 | 1/1974 | Strang | 44/66 |
| 3,873,276 | 3/1975 | Haemmerle et al. | 44/63 |
| 3,902,870 | 9/1975 | Rollmann et al. | 44/56 |
| 3,920,698 | 11/1975 | Haemmerle et al. | 260/326 |
| 3,955,938 | 5/1976 | Graham et al. | 44/51 |
| 3,980,448 | 9/1976 | Haemmerle et al. | 44/63 |
| 4,017,268 | 4/1977 | Gilley | 44/52 |
| 4,045,092 | 8/1977 | Keller | 302/66 |
| 4,112,889 | 9/1978 | Harpman | 123/25 |
| 4,180,036 | 12/1979 | Wolf | 123/122 |
| 4,194,886 | 3/1980 | Ripple | 44/70 |

(List continued on next page.)

OTHER PUBLICATIONS

Patrick Lee, "ARCO to Unveil Its Cleanest Gasoline Yet," *Los Angeles Times,* Jul. 10, 1991.

*San Francisco Chronicle,* "ARCO Going Cleaner," *Thousand Oaks News Chronicle,* Jul. 10, 1991.

Frederick Rose, "ARCO Unveils a Los-Polluting Gasoline But Won't Market It Except If Required," *Wall Street Journal,* Jul. 12, 1991.

(List continued on next page.)

*Primary Examiner*—Shean Wu

*Attorney, Agent, or Firm*—Tom F. Pruitt

[57] ABSTRACT

A method of reformulating a gasoline is provided to form a reformulated gasoline having as compared to the gasoline a reduction, upon burning and exhausting from a vehicle, of both hydrocarbon mass and reactivity of vehicle exhaust emissions and simultaneously a reduction of vehicle exhaust emissions of toxics, carbon monoxide and nitrogen oxides, wherein said gasoline comprises a concentration of aromatic compounds, olefinic compounds, and sulfur or sulfur-containing compounds and may be characterized by a 90 percent distillation temperature, said method comprising (a) reducing said concentration of aromatic compounds; (b) reducing said concentration of olefinic compounds; (c) reducing said concentration of sulfur or sulfur-containing compounds; (d) reducing said 90 percent distillation temperature; and (e) adding an oxygenate. A reformulated gasoline formulated by use of such method is also provided.

23 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 4,205,960 | 6/1980 | Bryant | 44/68 |
| 4,211,639 | 7/1980 | Jackson | 208/188 |
| 4,231,756 | 11/1980 | King | 44/53 |
| 4,244,703 | 1/1981 | Kaspaul | 44/56 |
| 4,297,172 | 10/1981 | Kyle | 203/19 |
| 4,336,032 | 6/1982 | Kupka et al. | 44/56 |
| 4,347,062 | 8/1982 | Born et al. | 44/68 |
| 4,378,230 | 3/1983 | Rhee | 44/51 |
| 4,420,930 | 12/1983 | Beuther et al. | 60/39.461 |
| 4,474,580 | 10/1984 | MacKenzie et al. | 44/68 |
| 4,684,373 | 8/1987 | Vataru et al. | 44/63 |
| 4,797,134 | 1/1989 | Vataru | 44/66 |
| 4,804,389 | 2/1989 | Johnston et al. | 44/70 |
| 4,818,250 | 4/1989 | Whitworth | 44/62 |
| 4,824,552 | 4/1989 | Nagasawa et al. | 208/17 |
| 4,852,992 | 8/1989 | Nasu | 44/50 |
| 4,895,640 | 1/1990 | Jackson | 208/188 |
| 4,955,332 | 9/1990 | Talbert | 123/1 |
| 5,004,850 | 4/1991 | Wilson | 585/1 |
| 5,015,356 | 5/1991 | Talbert | 208/16 |
| 5,032,144 | 7/1991 | Jessup et al. | 44/384 |
| 5,069,190 | 12/1991 | Richards | 123/538 |

OTHER PUBLICATIONS

Patrick Lee, "ARCO Ties 'Clean' Gasoline to New State Standards," *Los Angeles Times,* Jul. 12, 1991.

Vlae Kershner, "ARCO Says It Has Formulated Clean Gasoline of the Future," *San Francisco Chronicle,* Jul. 11, 1991.

N.Y. Times News Service, "ARCO Develops Pollutant-Cutting Gasoline," *Ontario, Calif. Inland Valley Daily Bulletin,* Jul. 11 1991.

N.Y. Times News Service, "ARCO to Tout New Fuel Today," *San Diego Union,* Jul. 11, 1991.

Audio Video Reporting Services, KBLA Radio News Broadcast, Jul. 10, 1991, 10:08 a.m.

Audio Video Reporting Services, KBLA Radio News Broadcast, Jul. 11, 1991, 7:56 a.m.

Audio Video Reporting Services, KBLA Radio News Broadcast, Jul. 11, 1991, 11:53 a.m.

Audio Video Reporting Services, KBLA Radio News Broadcast, Jul. 11, 1991, 12:08 p.m.

Audio Video Reporting Services, KBLA Radio News Broadcast, Jul. 11, 1991, 12:24 p.m.

Audio Video Reporting Services, KBLA Radio News Broadcast, Jul. 11, 1991, 12:33 p.m.

Audio Video Reporting Services, KBLA Radio News Broadcast, Jul. 11, 1991, 3:04 p.m.

Audio Video Reporting Services, KBLA Radio News Broadcast, Jul. 11, 1991, 6:05 p.m.

Audio Video Reporting Services, KBLA Radio News Broadcast, Jul. 11, 1991, 6:45 p.m.

Audio Video Reporting Services, KBLA Radio News Broadcast, Jul. 12, 1991, 8:26 a.m.

Brian Perry, "Regulators See Cleaner Fuel as Short-Term Solution," *Reuters Newsclips,* Jul. 11, 1991.

"News ARCO Fuel to Meet Strict Air Standards," *Reuters Newsclips,* Jul, 11, 1991.

Michael White, "ARCO Announces a Gasoline That Produces Less Smog," *The Philadelphia Inquirer,* Jul. 12, 1991.

"Lodwrick M. Cook, ARCO Chairman and CEO, announced the Company's EC-X gasoline in Los Angeles," *San Francisco, Calif. Chronicle,* Jul. 12, 1991.

Associated Press, "Precious Metal Prices Drop, With Platinum Leading Fall," *New York Times,* Jul. 12, 1991.

Peter Reich, "State Won't Get Cleaner ARCO Gas," *The Phoenix Gazette,* Jul. 13, 1991.

"ARCO Claims Greenie Gas Cheaper Than Methanol," *U.S. Oil Week,* Jul. 15, 1991.

"The California Model-State's fight against smog is being adopted in the Northeast," *Santa Barbara News--Press,* Jul. 16, 1991.

"Gee, Your Car Smells Terrific!," *Time,* Jul, 22, 1991.

"ARCO's Bid for Clean Fuels," *The Sacramento Bee,* Jul. 20, 1991.

"AQMD Doubts New Fuel Will Set Industry Standard," *Daily News,* Jul. 11, 1991.

"Reformulated Gasolines Fights Smog," *Star-News-/FICN,* Jul, 20-21, 1991.

(Article, written in Japanese, and photo of EC-X gas pump).

"Fuel for the Future," *The Spark,* ARCO/Aug. 1991.

"New Gas Cleanest Yet, ARCO Claims," *San Pedro, Calif. News Pilot,* Jul. 12, 1991.

"ARCO's Cleaner Fuel May Not Be Clean Enough," *The Sacramento Bee,* Jul. 12, 1991.

Michael White, "ARCO Holds Off on Cleaner Gasoline," *Las Vegas Review-Journal,* Jul. 12, 1991.

Staff Report, "California Phase 2 Reformulated Gasoline Specifications," vol. 1, Proposed Regulations for (List continued on next page.)

OTHER PUBLICATIONS

California Phase 2 Reformulated Gasoline, prepared by the State of California Air Resources Board, Stationary Source Division, Release Date: Oct. 4, 1991.

Staff Report, "California Phase 2 Reformulated Gasoline Specifications, vol. 2, Proposed Regulation for California Wintertime Oxygenates Program," prepared by the State of California Air Resources Board, Stationary Source Division, Release Date: Oct. 4, 1991.

Boekhaus, K. L., Dejovine, J. M., McHugh, K. J., Paulsen, D. A., Rapp, L. A., Segal, J. S., Sullivan, B. K., Townsend, D. J., "Reformulated Gasoline for Control Gasoline and Beyond," Society of Automotive Engineers 911628, Aug. 1991.

Auto/Oil Air Quality Improvement Research Program, Technical Bulletin No. 1, "Initial Mass Exhaust Emissions Results from Reformulated Gasolines," Dec. 1990.

Auto/Oil Air Quality Improvement Research Program, Technical Bulletin No. 6, "Emissions Results of Oxygenated Gasolines and Changes in RVP," Sep. 1991.

Benson, Jack D., Burns, Vaughn, Gorse, Robert A., Hochhauser, Albert M., Koehl, William J., Painter, Louis A., Reuter, Robert M., "Effects of Gasoline Sulfur Level on Mass Exhaust Emissions-Auto/Oil Air Quality Improvement Research Program," Society of Automotive Engineers, 912323, Oct. 1991.

Code of Federal Regulations, Title 40, Chapter 1, Part 86, Subpart B, Sections applicable to light-duty vehicles.

Boehaus, K. L., Cohu, L. K., DeJovine, J. M., Paulsen, D. A., Rapp, L. A., Segal, J. S., Townsend, D. J., "Reformulated Gasoline for Clean Air," presented at 2nd Biennial U.C. Davis Conference on Alternative Fuels, Jul. 12, 1990.

Carter, W. P. L., "Development of Ozone Reactivity Scales for Volatile Organic Compounds," Statewide Air Pollution Research Center, Riverside, Calif., U.S. EPA Contract CR-814396-01-0, Apr. 1990.

Staff Report, "Proposed Regulations for Low-Emission Vehicles and Clean Fuels," prepared by the State of California Air Resources Board, Mobile Source and Stationary Source Divisions, Release Date: Aug. 13, 1990.

REFORMULATED GASOLINES AND METHODS OF PRODUCING REFORMULATED GASOLINES

BACKGROUND OF THE INVENTION

1. Field of the Invention

This invention relates to reformulated gasolines. In another aspect, this invention relates to methods of gasoline reformulation to produce clean-burning reformulated gasolines.

2. Description of the Related Art

The Clean Air Act Amendments of 1990 require the sale, in the near future, of gasolines which reduce emissions of toxins and ozone-forming volatile organic compounds in certain non-attainment areas. In addition, various states are mandating cleaner burning fuels. In California, for example, the California Air Resources Board has issued regulations mandating that Phase II gasolines sold, in the near future, in their jurisdiction have specified performance characteristics to reduce emissions of the existing vehicle fleet.

These regulatory requirements, along with the public's and industry's desire for improved air quality, create the need for less polluting and more cost-effective vehicle and fuel technologies. Additionally, in the future, other regulatory requirements may be imposed.

For instance, the State of California has become very concerned about not only the mass of vehicle emissions but the tendency of these emissions to form ozone. This tendency of hydrocarbons to form ozone is referred to as "reactivity". Thus, future reformulated gasolines used as clean alternative fuels in low emission vehicles may be required to enable additional reductions of reactivity in vehicle exhaust emissions than is now required.

Thus, there is a need for reformulated gasolines which reduce, relative to existing industry average gasolines, vehicle exhaust emissions levels of both hydrocarbon mass and reactivity and, if possible, simultaneously reduce emissions of toxic compounds ("toxics"), carbon monoxide and nitrogen oxides.

Heretofore, refiners have blended refinery gasoline component streams to meet octane, vapor pressure and temperature range requirements, and there is a great deal of prior art on such blending. Opposite thereto, very little is known on blending to meet emissions requirements.

For instance, one key technical unknown or problem is how to reformulate gasolines with oxygenates without increasing emissions of nitrogen oxides. Some researchers have shown that adding fuel oxygenates to gasoline may increase emissions of oxides of nitrogen. For example, such is discussed in the report of the Auto/Oil Air Quality Improvement Research Program, entitled Technical Bulletin No. 6, "Emissions Results of Oxygenated Gasolines and Changes in RVP", September, 1991, and the Staff Report, "California Phase 2 Reformulated Gasoline Specifications, Volume 2, Proposed Regulation for California Wintertime Oxygenates Program", prepared by the California Air Resources Board, Stationary Source Division, Release Date: Oct. 4, 1991.

SUMMARY OF THE INVENTION

The present invention is based upon the surprising discovery of methods to reformulate gasoline to reduce both hydrocarbon mass and reactivity of vehicle exhaust emissions and simultaneously reduce exhaust emissions of toxics, carbon monoxide and nitrogen oxides.

The term "gasoline", as used in the specification and claims, means a mixture of liquid hydrocarbons having an initial boiling point somewhere in the range of about 65° F. to about 140° F. and a final boiling point somewhere in the range of about 250° F. to about 450° F. The term "reformulated gasoline", as used in the specification and claims, means a gasoline which has been produced by a method of this invention and, also, means a reformulated gasoline as described in this specification and the claims.

Gasolines for motor vehicles comprise various hydrocarbons, in varying amounts, including aromatics, olefins, paraffins, isoparaffins, naphthenes, and others, including complex, relatively high boiling unknowns. Most refiners produce gasolines by blending blend streams to meet principally an octane requirement, a boiling range requirement and a vapor pressure requirement. The blend streams are obtained from various refining processes such as fractional distillations, catalytic cracking, hydrocracking, alkylation, isomerization, polymerization, catalytic reforming, hydrogenation, aromatic separation and recovery, and the like.

The term "gasoline" is often misused, and gasoline is often misidentified or improperly characterized. Competition among refiners imposes constraints on refining economics, and therefore, motor vehicle gasoline generally is obtained by refining crude oil with the least practical processing expense. As a matter of such economics, motor vehicle gasoline meeting regulatory requirements and industry norms is thus not a highly purified petrochemical, nor mix of highly purified petrochemicals. The required gasoline component blend streams, and resulting gasoline blends, are obtained by each refiner in a manner, which generally involves, where possible for each such refiner, the least processing and handling and the least capital and operating expenditures. Gasoline compositions, and related refinery economics, for each refinery are impacted by available crude oil feed composition (including synthetic crudes from oil shales, tar sands, coal and the like), slate of refining processes available to each specific refinery, and a number of other factors.

This invention is directed to cleaner-burning reformulated gasolines, and teaches those skilled in the refining art, methods of reformulating gasolines to make such cleaner burning by treating and blending refinery streams to produce reformulated gasolines which reduce vehicle emissions. Refinery process and equipment changes required for adjustment or treatment of applicable existing streams for each different refinery, and those additional process and equipment requirements for each specific refinery, to produce a clean burning reformulated gasoline will become apparent to those skilled in the refining art from the disclosures of this invention.

The operation of an internal combustion engine with reformulated gasolines of this invention requires no engine modifications. No changes are thus required to existing ignition systems, to lube oil systems, to fuel injectors, carburetors, or other fuel feed systems, to fuel storage tanks, or to emission control systems or other components. Unlike the reformulated gasolines of this invention, specialty fuels such as fuels relatively high in methanol, require air-fuel ratio changes for fuel injectors and carburetors, require corrosion-resistent materials in certain applications, and require special lubrication systems, as well as requiring special storage, transportation, and retailing considerations. The reformulated gasolines of this invention avoid these and other disadvantages of specialty fuels.

DETAILED DESCRIPTION OF THE PREFERRED EMBODIMENTS OF THE INVENTION

In one embodiment of this invention, a method of reformulating a gasoline is provided to form a reformulated gasoline, having as compared to the gasoline, a reduction, upon burning and exhausting from a vehicle, of both hydrocarbon mass and reactivity of vehicle exhaust emissions and, simultaneously, a reduction vehicle exhaust emissions of toxics, carbon monoxide and nitrogen oxides, wherein the gasoline comprises a concentration of aromatic compounds, olefinic compounds, and sulfur or sulfur-containing compounds and may be characterized by a 90 percent distillation temperature. In one variation of this embodiment, the gasoline reformulation method comprises (a) reducing the concentration of aromatic compounds in the gasoline; (b) reducing the concentration of olefinic compounds in the gasoline; (c) reducing the concentration of sulfur or sulfur-containing compounds in the gasoline; (d) reducing the 90 percent distillation temperature of the gasoline; and (e) adding an oxygenate to the gasoline. In another embodiment of this invention, a reformulated gasoline, formulated by use of the method of the above described embodiment, is provided.

In a preferred variation of this embodiment of this invention, the concentration of aromatic compounds is reduced in the reformulated gasoline in an amount ranging from about 10 to about 70 percent of the aromatics in the unreformulated gasoline, and in another variation, more preferably total aromatics are reduced in a range of about 33 to about 66 percent. It is also preferred that the concentration of olefinic compounds is reduced in the reformulated gasoline in an amount ranging from about 10 to about 70 percent of the olefins in the unreformulated gasoline, and in another variation, olefinic compounds' concentration is more preferably reduced in the range of about 40 to about 60 percent. It is further preferred that the concentration of sulfur and sulfur-containing compounds is reduced in the reformulated gasoline in an amount ranging from about 65 to about 90 percent in the unreformulated gasoline, and in another variation, it is more preferred to reduce the concentration of sulfur in the reformulated gasoline to an amount not exceeding 100 parts per million by weight. It is still more preferable to reduce the concentration of sulfur in the reformulated gasoline to an amount in the range of about 30 to about 50 parts per million by weight. The term "sulfur-containing compounds", as used in the specification and claims, means entrained sulfur and compounds with a sulfur component, such as sulfur dioxide, sulfur trioxide and organosulfur compounds and the like. The term "sulfur", as used in the specification and claims, means the element sulfur, whether in combined or uncombined form.

In a still more preferred variation, the 90 percent distillation temperature of the gasoline is reduced in an amount ranging from about 10 percent to about 30 percent, and more preferably, the 90 percent temperature is reduced to a range from about 270° F. to about 310° F. The term "90 percent distillation temperature", as used in the specification and claims, means the 90 percent temperature of the gasoline and the reformulated gasoline determined using the procedures set out in ASTM procedure D86 of the American Society of Testing and Materials, effective as of Jul. 10, 1991.

Also in preferred variations of this embodiment of this invention, an oxygenate is added in an amount to provide the gasoline, as reformulated, with an oxygen concentration in the range of about 1 to about 4 percent by weight oxygen, and more preferably in the range of about 2 to about 3 percent by weight oxygen. Any oxygenate may be used for gasoline reformulation; however, different degrees of utility will be obtained with different oxygenates. In one variation of this embodiment, a preferred oxygenate is selected from the group consisting of an ether, an alcohol, a phenol, and an acetate, or mixtures thereof. The ether is preferably selected from the group consisting of methyl tert-butyl ether, ethyl tert-butyl ether, tert-amyl methyl ether, isopropyl tert-butyl ether, and sec-butyl tert-butyl ether, or mixtures thereof. Reformulating gasoline using other ethers and mixtures thereof with the listed preferred ethers and other ethers are within the scope of variations of this embodiment of this invention. The alcohol is preferably selected from the group consisting of methanol, isopropanol, ethanol, and butanol, or mixtures thereof, and other alcohols and mixtures of alcohols. Reformulating gasoline using other alcohols and mixtures thereof with the listed preferred alcohols and other alcohols are within the scope of variations of this embodiment of this invention. While alcohols are useful as oxygenates in variations of this embodiment of this invention, those skilled in the art understand that applying low boiling alcohols such as methanol, isopropanol, ethanol, and the like, particularly methanol, as an added oxygenate, requires special considerations in upstream processing and blending to obtain final product vapor pressures within the desired vapor pressure limits, which considerations may include further reduction of relatively higher vapor pressure, lower molecular weight hydrocarbons from one or more of the refinery obtained blend streams. Suitable phenols and acetates useful as oxygenates, and other suitable oxygenates, are well known in the art. In one variation, oxygenate addition is made to a final reformulated gasoline blend, before, after and/or at the same time other well-known additives, such as dyes, detergents, anti-oxidants and the like added to the reformulated gasoline.

All or many of the refining processes to make the reformulated gasolines of this invention are currently available to all refiners without modification of their refineries. In some instances, refinery unit additions and modifications will be required. Selection of the slate of refining processes to be used by each refiner to produce a reformulated gasoline of this invention will vary refinery to refinery, and will be selected, based on process economics, with competitive factors in mind.

For example, the gasoline or one or more intermediate streams to blend stocks or one or more blend stocks used for formulating the reformulated gasoline may be subject to hydrotreating conditions effective to reduce the concentration of, or remove sulfur or sulfur-containing compounds, in such intermediate streams, blend stocks and gasoline. The amount of hydrogenation treatment required will, as those skilled in the art understand, vary depending on the source of the gasoline charge to hydrogenation, the nature of the intermediate streams, the blend stocks and gasolines being treated, and other factors. For sulfur reduction or removal, hydrogenation may be used to treat straight run naphtha, gasoline blend stock from a fluid catalytic cracking unit, hydrocracking unit, or coking unit or any other number of intermediate streams to blend streams, or blend streams, or final blends, all as well known in the refining art.

Reforming processes are well known, as is the fact that prior art reformate is relatively high in aromatics content. Prior art reforming processes, either regenerative or semiregenerative processes, typically comprise multiple reactors and employ reforming catalysts, such as Group VIII metals (e.g. platinum) dispersed on a catalyst support, such as alumina, and various promoters such as halogen compounds, to accomplish the reforming reactions, including dehydrogenation, cyclization, aromatization, and isomerization and other reactions, at elevated temperatures and pressures. The reformate effluent from a reforming unit is usually passed through one or more separation zones to stabilize, by removal of a hydrogen-rich gas stream, the reformate product, which because of its relatively high octane value and aromaticity, is generally used as a blend stream.

To reduce aromatics content of blend streams to formulate a reformulated gasoline of this invention, one alternative variation of this embodiment is for a refiner to use less reformate in the reformulated gasoline blend or to make less use of the catalytic reformer, either by way of lower operating severity of reduced temperatures and pressures or by lower reformer rate. In addition, a refiner may cut the endpoint of reformer feeds or cut the endpoint of the reformate.

Thus, in one variation of a method of this invention for production of reformulated gasoline, the concentration of aromatic compounds in the gasoline are reduced by treating reformate product from a reforming unit by reformate splitting designed to permit separation and removal of the higher boiling fraction from the heavy reformate fraction, such as by fractionation, allowing the adjustment of the cut point of the reformate. It is preferred to separate from the reformate, and other blend streams having a relatively high concentration of aromatics, a hydrocarbon fraction having an initial boiling point to 400° F. endpoint, and in another variation, more preferably an 330° F. endpoint.

Those skilled in the refining art understand that certain aromatics reduction steps of this embodiment, such as the above described heavy reformate cut point adjustment, may also serve to favorably reduce the 90 percent distillation temperature of the reformulated gasoline and adjust the other ASTM D86 distillation temperatures. For example, in another variation, one or more precursors to benzene or other aromatic compounds are removed from the reformer feed. By way of illustration of this variation, the reformer feedstock can be tailored by fractionation, such as by treatment in a dehexanizer where the initial boiling point to C6 portion of the feedstock is separated out, with the fractionation bottoms used as reformer feed.

In other variations of this method to reformulate gasoline, aromatics removal from reformate and other streams may be by liquid phase extraction, molecular sieve absorption techniques, or other means for aromatics removal known in the art.

In another variation, the heavy ends of a catalyticly cracked gasoline, which are not only higher boiling, but are also rich in aromatics, are used as feed to a catalytic cracking unit to produce medium boiling point paraffins, having an initial boiling point and endpoint preferably in the range of about 120° F. to about 250° F., respectfully, and such paraffins are suitable as feedstocks for either alkylation or etherification units. Light hydrocarbons for blending and reformulation of gasoline may be treated by isomerization, alkylation after conversion to olefins, shape selective processing, and other treatments or be used as a gasoline blend component, as is well-understood by refiners.

Reduction of the concentration of olefinic compounds to produce a reformulated gasoline comprising a reduced olefin concentration relative to a base, unreformulated gasoline is preferably accomplished by one or more known refining procedures. Two principal sources of olefinic materials in a typical refinery are coker light gas oil and fluid catalytic cracking unit gas oil. The fluid unit effluent is preferably fractionated in a depentanizer to remove initial boiling point to C5 components, which are preferably used as alklyation feed, being isomerized where applicable. Coker gas oil is preferably hydrogenated for saturation and isomerized for production of i-C5 and i-C6 compounds. Those skilled in the refining art understand that certain steps of this embodiment for reduction of olefinic compounds, such as the above-described hydrogenation and isomerization, may also serve to favorably impact the 10 percent distillation temperature of the reformulated gasoline and adjust the other ASTM D86 distillation temperatures.

In still another variation of this embodiment of this invention, the 90 percent distillation temperature of a base gasoline is reduced to form a reformulated gasoline. One variation for such 90 percent distillation temperature reduction is to feed a relatively heavy high boiling, back end portion of the effluent stream from a fluid catalytic cracking unit to a hydrocracker and subject such stream to hydrocracking conditions of elevated temperature and pressure, in the presence of free and recycled hydrogen and in contact with a hydrocracking catalyst, for a period of time sufficient to crack the heavy components of such stream to lighter materials having a boiling range less than the boiling range of the feed to the hydrocracker.

In another embodiment of this invention, a reformulated gasoline is provided. The reformulated gasoline is formulated to comprise a 90 percent distillation temperature per ASTM D86 in the range of about 270° to about 310° F. and to comprise (a) a concentration of total aromatics in the range of about 10 to about 25 volume percent; (b) a concentration of olefins in the range of about 4 to about 10 volume percent; (c) a concentration of sulfur not exceeding about 100 parts by million by weight; and, (d) a concentration of oxygen in the range of about 1 to about 4 weight percent. In one variation, the reformulated gasoline formulated to have a Reid Vapor Pressure in the range of about 6 to about 8 psia. The term "total aromatics", as used in the specification and claims, means all aromatic compounds in the gasoline and reformulated gasoline, including but not limited to, benzene, toluene, ethylbenzene and other aromatics with 8 or less carbon atoms per molecule and aromatics with 9 or more carbon atoms per molecule such as cumene, 1-methyl, 2-ethylbenzene, 1,2,4-trimethylbenzene, and others. Preferably, a reformulated gasoline of this invention comprises less than about 30 to about 50 parts per million by weight sulfur. In one preferred variation of this embodiment, concentration of total aromatics of the reformulated gasoline is in the range of about 12 to about 22 volume percent.

In one preferred variation of this embodiment of this invention, the reformulated gasoline comprises a concentration of normal paraffins in the range of about 7 to about 12 volume percent, and in another variation, more preferably in the range of about 8.5 to about 9.5 volume percent. In another preferred variation, the reformulated gasoline comprises a concentration of isoparaffins in the range of about 35 to about 60 volume percent, and in another variation, more preferably in the range of about 40 to about 55 volume percent. In still another variation, the reformulated gasoline comprises a concentration of naphthenes in the range of about 6 to about 10 volume percent, and in another variation, more preferably in the range of about 6.5 to about 8 volume percent.

In another variation of this embodiment of this invention, the aromatics comprise benzene and the reformulated gasoline comprises a concentration of benzene not exceeding about 2 volume percent, and in an even more preferred variation, the concentration of benzene is in the range of about 0.4 to about 1.0 volume percent. In another variation, the aromatics comprise aromatics with 8 or more carbon atoms per molecule and the reformulated gasoline comprises a concentration of aromatics with 8 or more carbon atoms per molecule not exceeding about 20 volume percent.

In one variation of this embodiment, the reformulated gasoline is formulated to have a concentration of hydrogen in the range of about 14 to about 16 weight percent.

In another variation of this embodiment of this invention, a reformulated gasoline is formulated to comprise ATSM D86 distillation temperatures of (a) an initial boiling point in the range of about 70° to about 100° F.; (b) a 10 percent distillation temperature in the range of about 130° to about 145° F.; (c) a 50 percent distillation temperature in the range of about 180° to about 210° F.; (d) a 90 percent distillation temperature in the range of about 270° to about 310° F. and (e) an endpoint in the range of about 365° to about 400° F.

A preferred reformulated gasoline of this invention comprises an oxygenate added in an amount to provide the reformulated gasoline with an oxygen concentration in the range of about 1 to about 4 percent by weight oxygen. As discussed with the method above for producing a reformulated gasoline of this invention, the oxygenate is preferably selected from the group consisting of an ether, an alcohol, a phenol, and an acetate, or mixtures thereof. Preferred ethers added as oxygenates may be selected from the group consisting of methyl tert-butyl ether, ethyl tert-butyl ether, tert-amyl methyl ether, isopropyl tert-butyl ether, and sec-butyl tert-butyl ether, or mixtures thereof. The formulated gasoline may alternatively, or in combination, comprise an oxygenate selected from the group consisting of methanol, isopropanol, ethanol, and butanol, or mixtures thereof.

In a still further variation of this embodiment, the octane number of the reformulated gasoline, as indicate by the industry standard Research Octane plus Motor Octane divided by two, (R+M)/2, is in the range of about 86 to about 94. Preferably, the bromine number is in the range of about 9 to about 14, and in another variation, is more preferrably 9 or less. The API (American Petroleum Institute) gravity for preferred reformulated gasolines of this invention measured by industry standard tests for gasolines preferably are in the range of about 60 to 66, although higher densities are within the scope of this embodiment and will represent increased, per gallon of fuel, vehicle fuel economies.

The invention will be further understood by reference to the following examples, which include preferred embodiments of the invention.

EXAMPLE 1

Four separate test blend reformulated gasolines were prepared and identified as TB-1, TB-2, TB-3,and TB-4. One industry average gasoline, identified as I/A, was also prepared.

Using one variation of the method of reformulating gasoline of this invention, the four test fuels were custom blended, based primarily on existing refinery streams. The main blending components were obtained from the Los Angeles Refinery of ARCO Products Company, a division of Atlantic Richfield Company, and comprise alkylate, light hydrocrackate, heavy hydrocrackate, fluid catalytic cracking unit debutanizer bottoms, and fluid catalytic cracking unit rerun tower bottoms. The test fuels also comprise n-butane, i-pentane, i-hexane, n-hexane, methyl tert-butyl ether and reformate as components. In preparing the test fuels, the reformate and the fluid catalytic cracking unit rerun tower bottoms were fractionated to provide blending components having an initial boiling point to 330° F. endpoint, determined by ASTM D86. The fluid catalytic cracking unit rerun bottoms were also fractionated to provide a blending component having an initial boiling point to 400° F. endpoint, determined likewise by ASTM D86. The relatively high boiling bottoms cuts from these fractionations were not included in the test blends.

Benzene content of the test fuels were determined by the benzene content of the blending components, and were not adjusted for testing safety reasons.

Sulfur concentrations of the test fuels were closely monitored and controlled to maintain approximately 40 parts per million by weight total sulfur level in all four test blends. To maintain the approximate same sulfur concentration in all test fuels, test blends TB-3 and TB-4 were spiked with a sulfur compound, ditertiary butyl sulfide.

To the test fuels, a commerically available gasoline additive package, which comprises a detergent additive, was added and was blended into each test fuel at approximately 0.1 percent by volume. Any commerically available additive package could be used as such is not critical to the practice of this invention.

The I/A industry average base fuel was blended to the same specifications as the original Auto/Oil Air Quality Improvement Research Program industry average base fuel, as described in their Technical Bulletin No. 1, entitled "Initial Mass Exhaust Emissions Results from Reformulated Gasolines", December, 1990, except the benzene level of the I/A industry average of this Example 1 was not adjusted, for test safety reasons.

Analytical inspections of the four test blends and the I/A industry average gasoline revealed the following results:

TABLE 1

Summary of Analytical Results

| | I/A | TB-1 | TB-2 | TB-3 | TB-4 |
|---|---|---|---|---|---|
| Reid Vapor Press, psi | 8.6 | 7.9 | 6.7 | 7.7 | 7.0 |
| (kPa) | (59) | (54) | (46) | (53) | (48) |
| Normal paraffins*, vol % | 14.5 | 11.6 | 9.3 | 8.9 | 7.2 |
| Isoparaffins*, vol % | 34.9 | 39.2 | 39.6 | 52.0 | 53.2 |

TABLE 1-continued

Summary of Analytical Results

| | I/A | TB-1 | TB-2 | TB-3 | TB-4 |
|---|---|---|---|---|---|
| Total aromatics*, vol % | 34.4 | 21.2 | 21.6 | 12.2 | 12.0 |
| Benzene*, vol % | 1.0 | 0.7 | 0.7 | 0.4 | 0.4 |
| Toluene*, vol % | 6.6 | 5.0 | 4.8 | 2.3 | 2.6 |
| C8A*, vol % | 12.3 | 8.8 | 8.8 | 4.0 | 4.5 |
| Naphthenes*, vol % | 5.2 | 6.7 | 7.6 | 7.6 | 7.4 |
| Olefins*, vol % | 9.7 | 5.1 | 5.5 | 5.2 | 5.0 |
| Unknowns*, vol % | 1.3 | 0.9 | 1.5 | 0.7 | 0.8 |
| Methyl t-butyl ether vol % | 0.0 | 15.3 | 14.9 | 13.4 | 14.4 |
| Oxygen, wt % | 0.0 | 2.8 | 2.7 | 2.5 | 2.7 |
| Hydrogen, wt % | 13.3 | 14.4 | 14.0 | 14.8 | 14.8 |
| Sulfur, ppm | 349 | 39 | 41 | 31 | 33 |
| Gravity, API | 56.9 | 60.3 | 59.2 | 64.5 | 64.0 |
| Bromine Number | 22 | 12 | 9 | 9 | 9 |
| Octane, (R + M)/2 | 86.8 | 90.1 | 90.0 | 90.0 | 90.0 |
| D86, Distillation | | | | | |
| IBP, °F. | 86 | 98 | 72 | 91 | 92 |
| 10%, °F. | 126 | 135 | 142 | 133 | 134 |
| 50%, °F. | 213 | 201 | 201 | 188 | 188 |
| 90%, °F. | 323 | 289 | 293 | 278 | 274 |
| EP, °F. | 412 | 379 | 379 | 367 | 370 |

Note * to Table 1 indicates that component gas chromatograph analysis was adjusted to be consistent with oxygen analysis. In Table 1, and the specification and claims, the following abbreviations have these assigned meanings: ASTM = American Society of Testing and Materials; IBP = initial boiling point per ASTM procedure D86; EP = end point per ASTM D86; D86 = ASTM D86; C8A = all aromatics with 8 carbon atoms per molecule; psi = pounds per square inch; vol % = volume percent; ppm = parts per million by weight; API = American Petroleum Institute; R = Research Octane; and M = Motor Octane.

The test blend reformulated gasolines, TB-1, TB-2, TB-3, and TB-4, and the industry average base fuel I/A were tested in vehicles. The test fleet consisted of ten 1990 model-year California cars and trucks. Prior to testing, each of the ten test vehicles was inspected for mechanical problems, excessive fuel or oil leaks, exhaust leaks, and proper functioning of the emissions control components. Before testing and during testing, necessary repairs were made. The odometers at the start of testing ranged from about 13,000 miles to about 25,000 miles, with a fleet average of about 18,000 miles.

The vehicles represented a broad range of the products of domestic United States and foreign manufacturers. All of the vehicles were equipped with automatic transmissions. The vehicle technology varied in engine type from 4 to 8 cylinders, in engine size from 2.0 to 5.0 liters, and in engine emissions control systems, as further described in Table 2 below:

TABLE 2

Test Vehicle Summary

| Make | Model | Engine liters/gyl | Fuel System | Emission System |
|---|---|---|---|---|
| Ford | Taurus | 3.0/V6 | PFI | EGR/TWC |
| Toyota | Camry | 2.0/L4 | PFI | EGR/TWC |
| Plymouth | Sundance | 2.5/L4 | TBI | EGR/TWC |
| Honda | Accord | 2.2/L4 | PFI | EGR/TWC |
| Nissan | Stanza | 2.4/L4 | PFI | EGR/TWC/PA |
| Pontaic | Grand Am | 2.3/L4 | PFI | TWC |
| Ford | Crown Victoria | 5.0/V8 | PFI | EGR/2TWC & 20C/AP |
| Plymouth | Voyager | 3.3/V6 | PFI | EGR/TWC |
| Nissan | Pickup | 3.0/V6 | PFI | EGR/TWC |
| Buick | LeSabre | 3.8/V6 | PFI | EGR/TWC |

In Table 2, above, and in the specification and claims, the following abbreviations have been assigned these meanings—PFI=port fuel injection; TBI=throttle-body injection; EGR=exhaust gas recirculation; TWC=three way catalyst; OC=oxidizing catalyst; PA=pulse air; AP=air pump; L=linear cylinder arrangement; and V=V-shaped cylinder arrangement.

All four test fuel blends and the industry average I/A fuel were tested. When changing fuels tested, the vehicles were preconditioned by purging of the fuel and exhaust systems, by purging of the engine systems, and by preconditioning of evaporative canisters and adaptive learning systems.

Vehicle emissions were measured following the Environmental Protection Agency's Federal Test Procedure applicable to light duty gasoline vehicles, as described in Title 40 of the Code of Federal Regulations, Chapter 1, Part 86, Subpart B. These measurement procedures included measuring vehicle exhaust emissions during a dynamometer driving schedule and measuring vehicle evaporative emissions.

Regulated mass emissions were measured in duplicate. If duplicate analyses did not agree within 20%, testing was repeated and all data points were used in the test data reporting. The order in which the fuels were tested was randomized, except duplicate testing was conducted back to back. Each vehicle was tested on the industry average I/A base fuel at least four times and no vehicle drift or variabilities associated with time were detected.

The test vehicle exhaust emissions were analyzed to determine the mass emissions of total hydrocarbons (THC), non-methane organic gases (NMOG), carbon monoxide (CO), and nitrogen oxides (NOx) and toxics, including benzene, 1,3-butadiene, acetaldehyde and formalydehyde (collectively, Toxics), reactivity expressed as Carter Maximum Incremental Reactivities (CMIR), and ozone forming potential of the emission gases referred to as Carter Ozone Per Mile (COPM). Evaporative emissions were measured to determine the mass of the diurnal and hot soak losses. Evaporative emissions speciated data were used to determine the CMIR and benzene content of the diurnal and hot soak losses. Fuel economy was measured.

To determine hydrocarbon composition of vehicle exhausts, vehicle exhaust samples were speciated using a three part gas chromatograph (GC) analytical procedure. This GC procedure includes obtaining separate GC analyses (1) for C1-C3 compounds and benzene and toluene, (2) for C4 compounds including 1,3-butadiene and (3) for C5-C10 hydrocarbons. In addition, exhaust emissions were analyzed for aldehydes and ketones using sample collection by impingers and subsequent analysis by high performance liquid chromatography. The above analyses were combined to yield a single hydrocarbon speciation for each exhaust sample. For vehicle evaporative emissions, a single GC analysis was used to determine evaporative speciation for hydrocarbons as well as toxics.

All references to THC refer to uncorrected flame ionization detector measurements. All NMOG emissions were calculated from THC measurements by multiplying THC by the weight percentage of non-methane organic compounds obtained from the GC analysis.

CMIR's were calculated on a total hydrocarbon basis from the speciated data, following procedures discussed in "Development of Ozone Reactivity Scales for Volatile Organic Compounds", W. P. L. Carter, Statewide Air Pollution Research Center, Riverside, Calif., U.S. EPA Contract CR-814396-0101, April, 1990. Exhaust CMIR's were calculated by multiplying the individual component CMIR's by the corresponding component mass from the GC mass analyses, summing the individual products, and dividing by the total GC mass, resulting in units of grams of ozone per gram of THC (gO3/gTHC). COPM was calculated by multiplying THC by CMIR, resulting in units of grams of ozone per mile (gO3/mi). For both CMIR and COPM calculations, the reactivity and ozone forming potential of methane is included, but carbon monoxide is not included in calculations for either CMIR or COPM.

Test results were as set forth in Tables 3, 4, 5 and 6 below, with "% difference", expressed as per cent difference for each test blend fuel from the I/A base fuel:

TABLE 3

Exhaust Summary: THC, NMOG, CO and NOx

| | I/A | TB-1 | TB-2 | TB-3 | TB-4 |
|---|---|---|---|---|---|
| THC, grams/mile | 0.34 | 0.23 | 0.24 | 0.21 | 0.23 |
| % Difference | | −33% | −30% | −37% | −33% |
| NMOG, grams/mile | 0.30 | 0.19 | 0.20 | 0.18 | 0.18 |
| % Difference | | −37% | −34% | −40% | −39% |
| CO, grams/mile | 3.85 | 2.76 | 2.85 | 2.59 | 2.76 |
| % Difference | | −28% | −26% | −33% | −28% |
| NOx, grams/mile | 0.34 | 0.26 | 0.26 | 0.24 | 0.26 |
| % Difference | | −25% | −25% | −30% | −24% |

TABLE 4

Exhaust Reactivity and Ozone Formation Summary

| | I/A | TB-1 | TB-2 | TB-3 | TB-4 |
|---|---|---|---|---|---|
| CMIR, g O3/g THC | 2.33 | 2.01 | 2.00 | 1.82 | 1.80 |
| % Difference | | −14% | −14% | −22% | −23% |
| COPM, g O3/mi | 0.79 | 0.46 | 0.49 | 0.39 | 0.42 |
| % Difference | | −42% | −38% | −50% | −47% |

TABLE 5

Toxic Exhaust Emissions Summary

| milligrams/mile | I/A | TB-1 | TB-2 | TB-3 | TB-4 |
|---|---|---|---|---|---|
| Benzene | 16.21 | 7.02 | 8.58 | 4.97 | 5.13 |
| % difference | | −57% | −47% | −69% | −68% |
| Benzene, adjusted (1) | 18.61 | 7.25 | 8.86 | 6.08 | 6.27 |
| % difference | | −61% | −52% | −67% | −66% |
| 1,3-Butadiene | 1.95 | 1.30 | 1.34 | 1.08 | 1.24 |
| % difference | | −33% | −31% | −44% | −37% |
| Acetaldehyde | 0.73 | 0.53 | 0.50 | 0.52 | 0.53 |
| % difference | | −27% | −31% | −29% | −27% |
| Formaldehyde | 1.12 | 1.34 | 1.32 | 1.42 | 1.37 |
| % difference | | +20% | +18% | +28% | +23% |
| Total toxics | 20.01 | 10.19 | 11.74 | 8.00 | 8.27 |
| % difference | | −49% | −41% | −60% | −59% |
| Total toxics (1) | 22.41 | 10.42 | 12.03 | 9.11 | 9.41 |
| % difference | | −54% | −46% | −59% | −58% |

Note (1) to Table 5: Exhaust benzene levels are shown as actual (above listed in Table 5) and adjusted (below listed in Table 5). The actual blended levels were 1.0 vol % for the I/A base fuel and 0.4 and 0.7 vol % for the test blends. The desired benzene levels were 1.6 vol % for the I/A base fuel and 0.8 vol % for the test blends; therefore, adjusted exhaust benzene levels using the following equation: Ebz = 0.901 • Fbz + 0.092 • Ftol + 0.068 • Fha; where, Ebz = exhaust wt % benzene; Fbz = fuel wt % benzene; Ftol = fuel wt % toluene; and Fha = fuel wt % heavier aromatics, eg. aromatics with 8 or more carbon atoms per molecule.

TABLE 6

Evaporative Emissions Summary

| | I/A | TB-1 | TB-2 | TB-3 | TB-4 |
|---|---|---|---|---|---|
| Diurnal, g/test | 0.38 | 0.24 | 0.18 | 0.17 | 0.16 |
| % Difference | | −38% | −53% | −55% | −57% |
| Hot Soak, g/test | 0.33 | 0.39 | 0.28 | 0.29 | 0.26 |
| % Difference | | +17% | −15% | −14% | −21% |
| Total mass g/test | 0.72 | 0.63 | 0.46 | 0.46 | 0.43 |
| % Difference | | −12% | −35% | −36% | −40% |
| Benzene Diurnal mg/test | 4.60 | 2.38 | 2.47 | 2.25 | 2.71 |

TABLE 6-continued

Evaporative Emissions Summary

| | I/A | TB-1 | TB-2 | TB-3 | TB-4 |
|---|---|---|---|---|---|
| % Difference | | −48% | −46% | −51% | −41% |
| Benzene Hot Soak mg/test | 8.27 | 6.31 | 5.07 | 5.07 | 4.64 |
| % Difference | | −24% | −39% | −39% | −44% |
| CMIR Diurnal g O3/g THC | 1.35 | 1.44 | 1.44 | 1.44 | 1.63 |
| % Difference | | +6% | +7% | +6% | +12% |
| CMIR Hot Soak g O3/g THC | 1.65 | 1.52 | 1.52 | 1.62 | 1.72 |
| % Difference | | −8% | −8% | −2% | +4% |

When compared to the industry average I/A base fuel, all four test blends had substantial reductions in THC (30–37%), NMOG (34–40%), CO (26–33%) and $NO_x$ (24–30%). Also, substantial reductions in exhaust reactivity CMIR (14–23%) and COPM (38–50%) for the test fuels were obtained over the I/A base fuel. Large reductions of actual total toxics (41–60%) and adjusted total toxics (46–59%) were obtained for all test fuels over the I/A base fuel, with formaldehyde being the sole toxic with measured increases (+18–28%), which increases are believed to be attributed to the fuel oxygen supplied through the use of methyl t-butyl ether. Total evaporative emissions for all test blends decreased relative to the base fuel, with average reductions of diurnal mass (38–57%), diurnal benzene (41–51%) and hot soak benzene (24–44%). Fuel economy, calculated in miles per gallon (mpg), was reduced from about 3 to about 6%. The reductions in fuel economy are believed to be due primarily to the displacement of hydrogen and carbon by the addition of oxygen and in part due to modest reductions in test fuel density.

It is surprising to note that, despite the relatively large difference in total aromatics in reformulated gasolines TB-1 and TB-2 versus reformulated gasolines TB-3 and TB-4, the differences in exhaust benzene levels are relatively small.

While the invention has been described in conjunction with presently preferred embodiments and variations, it is obviously not limited thereto.

What is claimed is:

1. A method of reformulating a gasoline to form a reformulated gasoline, having as compared to the gasoline, a reduction, upon burning and exhausting from a vehicle, of both hydrocarbon mass and reactivity of vehicle exhaust emissions and simultaneously a reduction of vehicle exhaust emissions of toxics, carbon monoxide and nitrogen oxides, wherein said gasoline comprises a concentration of aromatic compounds, olefinic compounds, and sulfur or sulfur-containing compounds and may be characterized by a 90 percent distillation temperature, said method comprising:

a. reducing said concentration of aromatic compounds;

b. reducing said concentration of olefinic compounds;

c. reducing said concentration of sulfur or sulfur-containing compounds;

d. reducing said 90 percent distillation temperature; and e. adding an oxygenate.

2. A method in accordance with claim 1 wherein said concentration of aromatic compounds is reduced in an amount ranging from about 10 to about 70 percent.

3. A method in accordance with claim 1 wherein said concentration of olefinic compounds is reduced in an amount ranging from about 10 to about 70 percent.

4. A method in accordance with claim 1 wherein said concentration of sulfur and sulfur-containing compounds is reduced in an amount ranging from about 65 to about 90 percent.

5. A method in accordance with claim 1 wherein said 90 percent distillation temperature is reduced in an amount ranging from about 10 percent to about 30 percent.

6. A method in accordance with claim 1 wherein said oxygenate is added in an amount to provide said gasoline with an oxygen concentration in the range of about 1 to about 4 percent by weight oxygen.

7. A method in accordance with claim 1 wherein said oxygenate is selected from the group consisting of an ether, an alcohol, a phenol, and an acetate, or mixtures thereof.

8. A method in accordance with claim 1 wherein said oxygenate is selected from the group consisting of methyl tert-butyl ether, ethyl tert-butyl ether, tert-amyl methyl ether, isopropyl tert-butyl ether, and sec-butyl tert-butyl ether, or mixtures thereof.

9. A method in accordance with claim 1 wherein said oxygenate is selected from the group consisting of methanol, isopropanol, ethanol, and butanol, or mixtures thereof.

10. A method in accordance with claim 1 wherein the Reid Vapor Pressure of said reformulated gasoline is in the range of about 6 to about 8 psia.

11. A method in accordance with claim 1 where said 90 percent distillation temperature of said reformulated gasoline is in the range of about 270° to about 310° F.

12. A reformulated gasoline formulated by the method of claim 1.

13. A reformulated gasoline formulated to have a 90 percent distillation temperature per American Society of Testing and Materials Procedure D86 in the range of about 270° to about 310° F. and comprising:

a. a concentration of total aromatics in the range of about 10 to about 25 volume percent;

b. a concentration of olefins in the range of about 4 to about 10 volume percent;

c. a concentration of sulfur not exceeding about 100 parts by million by weight; and, d. a concentration of oxygen in the range of about 1 to about 4 percent.

14. A reformulated gasoline in accordance with claim 13 formulated to have a Reid Vapor Pressure in the range of about 6 to about 8 psia.

15. A reformulated gasoline in accordance with claim 13 comprising a concentration of normal paraffins in the range of about 7 to about 12 volume percent.

16. A reformulated gasoline in accordance with claim 13 comprising a concentration of isoparaffins in the range of about 35 to about 60 volume percent.

17. A reformulated gasoline in accordance with claim 13 comprising a concentration of naphthenes in the range of about 6 to about 10 volume percent.

18. A reformulated gasoline in accordance with claim 13 wherein said aromatics comprise benzene and said reformulated gasoline comprises a concentration of said benzene in an amount not exceeding about 2 volume percent.

19. A reformulated gasoline in accordance with claim 13 wherein said aromatics comprise aromatics with 8 or more carbon atoms per molecule and said reformulated gasoline comprises a concentration of said aromatics with 8 or more carbon atoms per molecule in an amount not exceeding about 20 volume percent.

20. A reformulated gasoline in accordance with claim 13 comprising an oxygenate added in an amount to provide said reformulated gasoline with an oxygen concentration in the range of about 1 to about 4 percent by weight oxygen.

21. A reformulated gasoline in accordance with claim 20 wherein said oxygenate is selected from the group consisting of an ether, an alcohol, a phenol, and an acetate, or mixtures thereof.

22. A reformulated gasoline in accordance with claim 20 wherein said oxygenate is selected from the group consisting of methyl tert-butyl ether, ethyl tert-butyl ether, tert-amyl methyl ether, isopropyl tert-butyl ether, and sec-butyl tert-butyl ether, or mixtures thereof.

23. A reformulated gasoline in accordance with claim 20 wherein said oxygenate is selected from the group consisting of methanol, isopropanol, ethanol, and butanol, or mixtures thereof.

* * * * *